United States Patent [19]

Stern et al.

[11] Patent Number: 5,013,128

[45] Date of Patent: May 7, 1991

[54] FIBER OPTIC LIGHT GUIDE WITH IMPROVED END-TO-END EFFICIENCY

[75] Inventors: Theodore G. Stern; Mickey Cornwall, both of San Diego, Calif.

[73] Assignee: General Dynamics Corporation, Convair Division, San Diego, Calif.

[21] Appl. No.: 534,984

[22] Filed: Jun. 7, 1990

[51] Int. Cl.⁵ .............................................. G02B 6/04
[52] U.S. Cl. ............................ 350/96.24; 350/96.23; 350/96.33
[58] Field of Search ............... 350/96.22, 96.24, 96.25, 350/96.26, 96.33, 96.23

[56] References Cited

U.S. PATENT DOCUMENTS

| | | | |
|---|---|---|---|
| 3,950,075 | 4/1976 | Cook et al. | 350/96.22 X |
| 4,127,319 | 11/1978 | Forney, Jr. et al. | 350/96.20 |
| 4,141,623 | 2/1979 | Dubost et al. | 350/96.23 |
| 4,483,585 | 11/1984 | Takami | 350/96.24 |
| 4,576,435 | 3/1986 | Nishioka | 350/96.26 |
| 4,585,305 | 4/1986 | Chazelas et al. | 350/96.23 X |
| 4,615,583 | 10/1986 | Tsuno et al. | 350/96.33 |
| 4,647,153 | 3/1987 | Utsumi et al. | 350/96.25 |
| 4,662,714 | 5/1987 | Mori | 350/96.24 X |
| 4,666,245 | 5/1987 | Pointer | 350/96.24 |
| 4,690,500 | 9/1987 | Hayami et al. | 350/96.25 |
| 4,697,873 | 10/1987 | Bouvard et al. | 350/96.23 |
| 4,784,144 | 11/1988 | Ono et al. | 350/96.33 X |
| 4,896,941 | 1/1990 | Hayashi et al. | 350/96.25 |
| 4,921,326 | 5/1990 | Wild et al. | 350/96.26 |

*Primary Examiner*—Brian Healy
*Attorney, Agent, or Firm*—John R. Duncan; Frank D. Gilliam

[57] ABSTRACT

Inexpensive, highly efficient, flexible, fiber optic light guide which includes a plurality of flexible optic fibers which are unclad along their length and arranged in a bundle to increase packing density with all the ends of the fibers of the bundle falling in common planes at the entry and exit ends of the light guide. The flexible optic fiber bundle is provided with a suitable protective cladding which also may include a layer of clad optic fibers that surround the bundle. Light incident at one end of the light guide is reflected internally along the longitudinal length of the guide by a cladding boundary or space boundary so that transmission losses are minimized. Suitable ferrules may be provided at each end of the light guide.

3 Claims, 2 Drawing Sheets

FIBER OPTIC LIGHT GUIDE WITH IMPROVED END-TO-END EFFICIENCY

BACKGROUND OF THE INVENTION

1. Field of the Invention

This invention relates generally to an improvement in optic light wave guides and more particularly, but not by way of limitation, to a flexible, inexpensive, efficient optic fiber light guide which utilizes a plurality of flexible unclad optic fibers for improved end to end efficiency.

2. Description of the Prior Art

A need exists for an improved optic light wave guide. Known fiber optic light guides have limited efficiency, that is less than 70%, because of the aperture area that is lost to the protective cladding. Clad solid optic light rods have an improved efficiency but are not flexible and have a limited producible length of less that five meters. Accordingly, the purpose of this invention is to improved the efficiency of a flexible fiber optic light guide in delivered light compared to the light incident on its entrance aperture.

The following patents while of interest in the general field to which the invention pertains, do not disclose the particular aspects of the invention that are of significant interest.

U.S. Pat. No. 4,662,714 issued of May 5, 1987 to Kei Mori discloses a large number of optical conductor cables that are integrated and connected to a single optical conducting rod for use in transmitting light energy through a solid optical conducting rod. The integrated construction comprises a large number of optical conductor cable and a large number of optical fibers, the bundle of which is unbound ate one end of each optical conductor cable. The unbound ends of the optic fibers are then arranged in a common plane and bound to an end of the solid optical conducting rod by a suitable adhesive. The Mori patent does not teach a flexible fiber optic light guide which utilizes a bundle of unclad flexible optic fibers to transmit light while precluding excessive transmission losses.

U.S. Pat. No. 4,697,873 issued on Oct. 6, 1987 to Andre Bouvard et al is directed to a device for optical fibers freed at the end of a cable element. It comprises a sleeve in which the end of a fiber optic cable element is forcibly fitted and a plurality of flexible sheaths are mounted in the line of extension of the sleeve. Each fiber optic of the cable is positioned within and protected by one of such sheaths. Again, there is no showing of a flexible fiber optic light guide which utilizes a bundle of unclad flexible optic fibers to transmit light with improved efficiency.

U.S. Pat. No. 4,666,245 issued May 19, 1987 to John Pointer relates to a fiber optic cable assembly which has three discrete bundles of optic fibers. One bundle is arranged centrally with the other two bundles being shaped in a C-shape and located on opposite sides of the central bundle. A cylindrical ferrule surrounds the end of the cable assembly. The Pointer patent does not teach a flexible fiber optic light guide which utilizes a plurality of unclad optic fibers that trap the maximum amount of light that is being transmitted therethrough.

U.S. Pat. No. 4,483,585 issued on Nov. 20, 1984 to Akiyoshi Takami discloses an illumination device having an optical light guide formed as a fiber bundle. The ends of the fibers fall in a common plane which is positioned against a light guide which is positioned within a ferrule. The Takami patent does not disclose a flexible optic fiber guide which uses a plurality of unclad fiber arranged in a bundle within a suitable protective cladding.

U.S. Pat. No. 4,585,305 issued Apr. 29, 1986 to Elie C. Chazelas II et al discloses a device for arraying the ends of optical fibers disposed around an axially symmetrical structure. The device includes a solid elongate body having first and second opposite end faces between which extend elongated fibers, each groove receives one optic fiber. There is no teaching of a flexible optic fiber light guide which uses a plurality of unclad optic fibers arranged in a bundle with an outer protective cladding.

U.S. Pat. No. 4,576,435 issued on Mar. 18, 1986 to Kimihiko Nishioka relates to light transmitting device that includes a light guide formed by a bundle of optical fibers. Light from a light source is parred through a condenser lens to impinge upon the incident end face of the light guide for transmission to the exiting end face thereof. The Nishioka reference does not teach a flexible fiber optic light guide with improved end to end efficiency that uses a plurality of unclad fibers arranged in a bundle to transmit light.

U.S. Pat. No. 4,141,623 issued Feb. 27, 1979 to Rene Dubost et al discloses a optical fibre cable which includes a central core round which is the optical conductors are concentrically arranged. Each optical conductor is constituted of an optical fiber protected by a first layer of polyamide and a second layer of polyethylene. To avoid distortion of the optical fiber, the second layer is stretched. The Dubost patent does not teach a flexible fiber optic light guide which uses a bundle of flexible unclad optic fibers that are protected by a suitable cladding and which permits crosstalk among the unclad fibers while minimizing transmission loss.

SUMMARY OF THE INVENTION

In accordance with the present invention, there is provided an inexpensive, highly efficient, flexible optic fiber light guide which includes a flexible bundle of unclad optic fibers that have their ends arranged in a common plane. The bundle of flexible optic fibers is provided with a protective cladding. A layer of clad optic fibers may be interposed between the protective cladding and the flexible bundle of optic fibers. A suitable ferrule is provided at each end of the light guide with the thicknesses of the cladding being determined to permit all light incident upon the entrance aperture of the light guide to fall upon the common ends of the fiber bundle. Since the light passing through the light guide is reflected only from space boundaries between boundaries of the fibers and from the cladding maximum transmission of light is provided.

Other features and attendant advantages of the present invention will become apparent to those skilled in the art from a reading of the following detailed description constructed in accordance with the accompanying drawings and wherein:

DESCRIPTION OF THE PREFERRED EMBODIMENT

Figure 1:
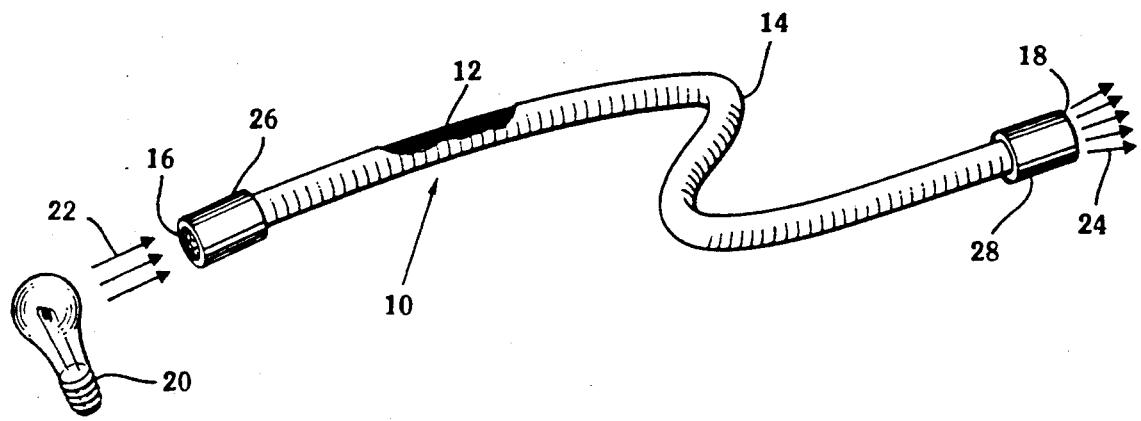
FIG. 1 illustrates a preferred embodiment of a flexible fiber optic light guide with improved end to end efficiency constructed in accordance with the principle of the present invention.

Referring now to the drawing in detail and in particular to FIG. 1, the reference character 10 generally designates a flexible fiber optic light guide constructed in accordance with the present invention. The flexible light guide 10 includes a central bundle of suitable flexible optic fibers 12 that is provided with a suitable protective cladding or jacket 14. The optic fibers 12 are preferably stripped of insulation along their entire length so as to be unclad. The ends 16 and 18 of the fiber bundle 12 fall into a common plane. The entry end 16 of the flexible fiber bundle 12 receives incident light from a suitable light source 20 as illustrated by the light rays 22. The light rays 22 traverse the longitudinal length of the optic fiber light guide 10 through the bundle of flexible optic fibers 12 and exits at the exit end 18 of the light guide as light rays 24.

Figure 2:
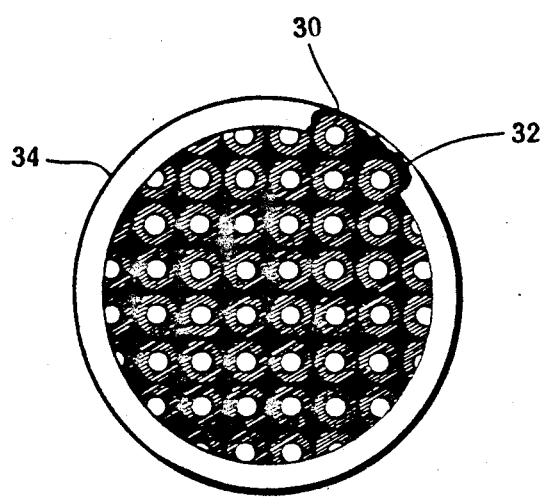
FIG. 2 is a simplified partially cut away end view of a light guide which is exemplary of the prior art.
Figure 3:
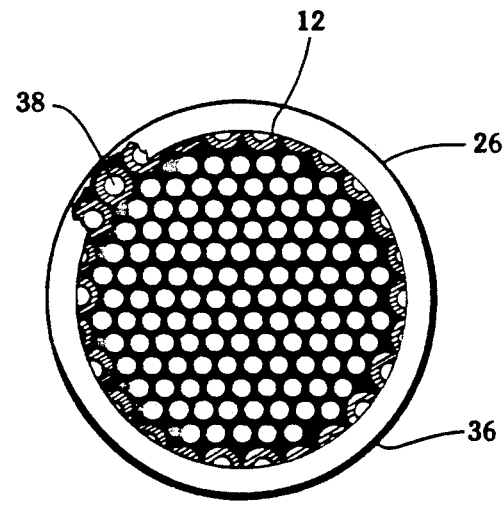
FIG. 3 is a simplified partially cut away end view of the flexible fiber optic light guide shown in FIG. 1.
Figure 4:
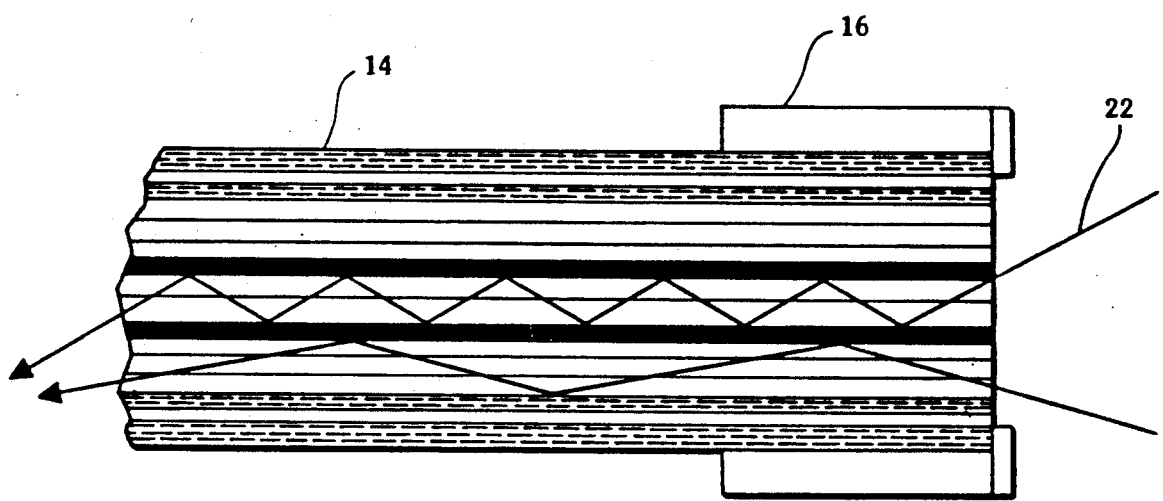
FIG. 4 is a diagrammatic side view of one end of the fiber optic guide of the present invention shown in FIG. 1 and illustrating reflection of the light rays incident upon the entry aperture as they travel longitudinally through the light guide.

Referring now to FIGS. 2 and 3, a difference between the known fiber optic light guide of the past and the improved light guide of the present invention will be illustrated. As seen previously in FIG. 1, the light guide 10 is provided at each end with suitable ferrules 26 and 28 as are well known in the art. In the conventional light guide of the prior art as seen in FIG. 2, a bundle of clad optic fibers 30 provide the means for transmitting light. The bundle of clad fibers 30 are protected by a suitable cladding 32 and a conventional ferrule 34 is provided. It is evident that for a fiber optic wave guide of acceptable diameter the clad fibers 30 occupy a certain cross sectional area in which a substantial portion of that area is occupied by the cladding which surrounds each fiber 30.

In contrast it will be seen in FIG. 3 that the bundle of unclad fibers 12 provides a very closely packed bundle of fibers and thereby permits more of the light 22 that is incident upon the entry end to be transmitted to the exit end 18 of the light guide 10 of the present invention. Since a ferrule 26 will be placed at the end of the light guide 10 as per conventional practice, a portion of the light guide bundle 12 will be shielded from incident light rays 22 by the front rim 36 of the ferrule 26. Since a portion of the light rays 22 will be shield it is advantageous to surround the outer periphery of the bundle 12 with a least one layer of clad flexible optic fibers 38 which are then surrounded by the conventional protective jacket 14

Referring now to FIG. 3, the light trapping action of the light guide 10 of the present invention will be illustrated. The core of each unclad fiber is shown as white while the spaces between such unclad fibers 12 is shown in black as is the cladding of the layer of clad fibers 38 and the protective jacket 14. As the incident light 22 enters the optic guide 10 it can travel directly through each unclad flexible fiber or if the light rays 22 enter at an angle they can travel through adjacent unclad fibers and be reflected at the interface provided by the spaces that may appear between certain adjacent unclad fibers or at the clad flexible layer of optic fibers 38. In any event the unclad fibers may be tightly packed and thereby reduce the loss associated with limitations on packing density because of fiber cladding volume. The tight packing of the fiber bundle 12 provides greater efficiency because of the total internal reflection along the length of the light guide 10 and the elimination of the loss associated with the volume of the cladding of the fibers as seen in FIG. 2.

In summary, a flexible fiber light guide comprising a bundle of unclad optic fibers, ferrules at each end, and a jacket for mechanical and environmental stability has been shown. During passage of light through the light guide crosstalk is possible between the inner unclad fibers but the light while it may pass from one fiber to another is eventually trapped because it is reflected either at a space boundary or at a cladding boundary. It should be noted that the core of the cladded fibers at the outer circumferential layer do not carry andy light because their cores are blocked by the ferrule and they could be eliminated that is, the cladding could be applied to the core bundle directly. It would also be within the scope of the present invention to clad the fibers of the inner core along their length, except for the end, or they could be bare unclad cores along their length.

Changes may be made in the combination and arrangement of parts or elements as heretofore set forth in the specification and shown in the drawings, it being understood that changes may be made in the precise embodiment disclosed without departing g from the spirit and scope of the invention as defined in the following claims;

We claim:

1. An inexpensive, highly efficient, flexible fiber optic light guide comprising:

a longitudinally extending flexible optical fiber light guide means, said fiber optic light guide means comprises a bundle of conventional flexible optic fibers that has at least a portion of which includes light fibers unclad along at least a portion of their length, having an aperture adapted to receive light and an aperture adapted to exit light, a layer of clad optic fibers arranged around the outer periphery of the flexible light guide means; and longitudinally extending flexible cladding means to protect the flexible optic light guide means from external damage.

2. The fiber optic light guide of claim 1 wherein the ends of the flexible light guide means have faces that are normal to the longitudinal axis of the light guide for receiving incident light and exiting light.

3. The fiber optic light guide of claim 1 wherein a ferrule surrounds each end of the fiber optic guide.

* * * * *